(12) United States Patent
Johnson et al.

(10) Patent No.: US 12,045,925 B2
(45) Date of Patent: Jul. 23, 2024

(54) COMPUTING IMAGES OF HEAD MOUNTED DISPLAY WEARER

(71) Applicant: Microsoft Technology Licensing, LLC, Redmond, WA (US)

(72) Inventors: Matthew Alastair Johnson, Cambridge (GB); Marta Malgorzata Wilczkowiak, Cambridge (GB); Daniel Stephen Wilde, Cambridge (GB); Paul Malcolm McIlroy, Cambridge (GB); Tadas Baltrusaitis, Cambridge (GB); Virginia Estellers Casas, Cambridge (GB); Marek Adam Kowalski, Cambridge (GB); Christopher Maurice Mei, Redmond, WA (US); Stephan Joachim Garbin, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 16/899,555

(22) Filed: Jun. 11, 2020

(65) Prior Publication Data
US 2021/0390767 A1 Dec. 16, 2021

(51) Int. Cl.
*G06T 15/04* (2011.01)
*G06F 18/214* (2023.01)
(Continued)

(52) U.S. Cl.
CPC .......... *G06T 15/04* (2013.01); *G06F 18/2148* (2023.01); *G06T 13/40* (2013.01);
(Continued)

(58) Field of Classification Search
CPC ..... G06T 15/205; G06T 13/40; G06T 17/205; G06K 9/00214; G06K 9/00315; G06K 9/6257
See application file for complete search history.

(56) References Cited

U.S. PATENT DOCUMENTS 10,636,193 B1 4/2020 Sheikh et al.
2018/0137366 A1* 5/2018 Szeto ................ G06V 10/758
(Continued)

OTHER PUBLICATIONS

Ganin, Yaroslav, et al. "Deepwarp: Photorealistic image resynthesis for gaze manipulation." European conference on computer vision. Springer, Cham, 2016. (Year: 2016).*

Kawai, Masahide, et al. "Automatic Generation of Photorealistic 3D Inner Mouth Animation only from Frontal Images." Journal of Information Processing 23.5 (2015): 693-703. (Year: 2015).*

(Continued)

*Primary Examiner* — Xin Sheng
(74) *Attorney, Agent, or Firm* — Barta Jones, PLLC (57) ABSTRACT

In various examples there is an apparatus for computing an image depicting a face of a wearer of a head mounted display (HMD), as if the wearer was not wearing the HMD. An input image depicts a partial view of the wearer's face captured from at least one face facing capture device in the HMD. A machine learning apparatus is available which has been trained to compute expression parameters from the input image. A 3D face model that has expressions parameters is accessible as well as a photorealiser being a machine learning model trained to map images rendered from the 3D face model to photorealistic images. The apparatus computes expression parameter values from the image using the machine learning apparatus. The apparatus drives the 3D face model with the expression parameter values to produce a 3D model of the face of the wearer and then renders the 3D model from a specified viewpoint to compute a rendered image. The rendered image is upgraded to a photorealistic image using the photorealiser.

20 Claims, 7 Drawing Sheets

(51) Int. Cl.
  *G06T 13/40*    (2011.01)
  *G06T 15/20*    (2011.01)
  *G06T 17/20*    (2006.01)
  *G06V 20/64*    (2022.01)
  *G06V 40/16*    (2022.01)

(52) U.S. Cl.
  CPC .......... *G06T 15/205* (2013.01); *G06T 17/205* (2013.01); *G06V 20/653* (2022.01); *G06V 40/176* (2022.01)

(56) References Cited

U.S. PATENT DOCUMENTS

| | | |
|---|---|---|
| 2018/0158246 A1 | 6/2018 | Grau et al. |
| 2018/0374242 A1 | 12/2018 | Li et al. |
| 2020/0160582 A1* | 5/2020 | Bouaziz ................ G06T 15/503 |
| 2020/0312043 A1* | 10/2020 | Peng .................... G06T 7/90 |
| 2020/0402284 A1* | 12/2020 | Saragih ................. G06T 17/00 |

OTHER PUBLICATIONS

Kuster, C., Popa, T., Bazin, J.C., Gotsman, C., Gross, M.: Gaze correction for home video conferencing. In: SIGGRAPH Asia (2012) (Year: 2012).*

"R3DS—Russian3DScanner", Retrieved from: https://web.archive.org/web/20200418013454/https://www.russian3dscanner.com/, Retrieved Date: Apr. 18, 2020, 06 Pages.

Elgharib, et al., "EgoFace: Egocentric Face Performance Capture and Videorealistic Reenactment", In Journal of Computing Research Repository, May 26, 2019, 10 Pages.

Lombardi, et al., "Deep Appearance Models for Face Rendering", In Journal of ACM Transactions on Graphics, vol. 37, Issue 4, Article 68, Aug. 2018, 13 Pages.

Zakharov, et al., "Few-Shot Adversarial Learning of Realistic Neural Talking Head Models", In Proceedings of the IEEE International Conference on Computer Vision, Oct. 27, 2019, pp. 9459-9468.

Kim, et al., "Deep Video Portraits", In Journal of ACM Transactions on Graphics, vol. 37, Issue 4, Aug. 2018, 14 Pages.

"International Search Report and Written Opinion Issued in PCT Application No. PCT/US21/029506", Mailed Date: Aug. 5, 2021, 12 Pages.

* cited by examiner

COMPUTING IMAGES OF HEAD MOUNTED DISPLAY WEARER

BACKGROUND

Head mounted displays (HMDs) enable mixed reality and virtual reality applications and are used in a variety of domains including aeronautics, defense, medicine, engineering, education, entertainment and others. Ways to improve the usability and functionality of HMDs will therefore be beneficial in a wide range of scenarios. An HMD is a display apparatus, designed to be worn on the head of a wearer. In some cases an HMD is mounted on or integral with a helmet.

The embodiments described below are not limited to implementations which solve any or all of the disadvantages of known HMDs and applications using HMDs.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus for computing an image depicting a face of a wearer of a head mounted display (HMD), as if the wearer was not wearing the HMD. An input image depicts a partial view of the wearer's face captured from at least one face facing capture device in the HMD. A machine learning apparatus is available which has been trained to compute expression parameters from the input image. A three-dimensional (3D) face model that has expression parameters is accessible as well as a photorealiser being a machine learning model trained to map images rendered from the 3D face model to photorealistic images. The apparatus computes expression parameter values from the image using the machine learning apparatus. The apparatus drives the 3D face model with the expression parameter values to produce a 3D model of the face of the wearer and then renders the 3D model from a specified viewpoint to compute a rendered image. The rendered image is upgraded to a photorealistic image using the photorealiser.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

A fundamental problem which any head-mounted display (HMD) system must overcome is how the wearer is presented when making video calls, both to others wearing HMDs (symmetric HMD video calling) and to those using traditional displays (asymmetric HMD video calling). Since the HMD obscures the face, in particular the eyes, and the user is often mobile and not in range of a suitable capture device, in some way the sensors on the HMD itself are to be used to create a believable representation of the user for the purpose of display on the call.

The term "photorealistic" is used to describe an image which appears to the human eye as if it were a photograph.

Figure 1:
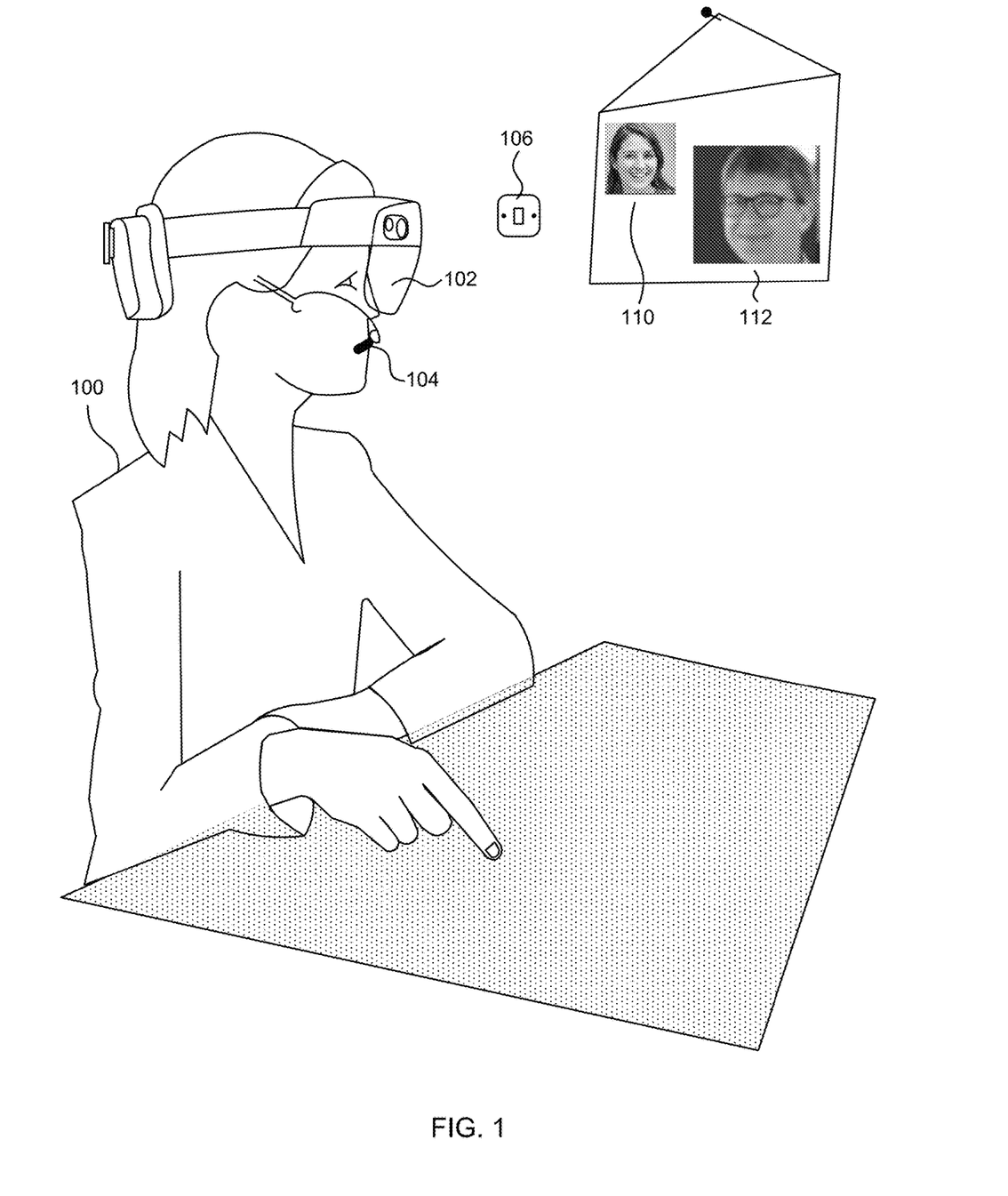
FIG. 1 is a schematic diagram of a person wearing an HMD and participating in a video conference call where a remote party views the person as if she were not wearing the HMD.

FIG. 1 is a schematic diagram of a person 100 wearing an HMD 102 and participating in a video conference call where a remote party 112 views the person as if she were not wearing the HMD. The HMD worn by the person 100 is referred to as a local party of the video conference call. The HMD 102 comprises a visor through which the person 100 is able to view her environment. The HMD also comprises one or more display devices which emit light directly into the person's eyes in order to display one or more holograms of virtual objects to create mixed-reality applications. In the example of FIG. 1 the virtual objects comprise a video of a remote party 112 in a video conference call with the person, as well as a video 110 of the HMD wearer herself as if she were not wearing the HMD. The virtual objects are displayed as if they are on a physical notice board in the person's environment. The physical notice board is hanging on a physical wall near a physical light switch and the person is sitting at a physical table. The virtual objects including the video of the remote party 112 and the video 110 of the HMD wearer are not visible to other people in the same room as the person who are not wearing HMDs.

The example in FIG. 1 involves asymmetric HMD video calling since the remote party 112 is using a traditional display such as a laptop computer with an integral webcam. The remote party 112 receives a virtual webcam stream from the local party in which the person 100 is depicted as not wearing the HMD and where the facial expressions match those of the person 100 and the person 100 is depicted in a realistic manner with verisimilitude to the person 100. The viewpoint of the virtual webcam is preconfigured or set according to user preferences.

The example in FIG. 1 is extended to the case of symmetric HMD video calling where the remote party 112 is also wearing an HMD. The remote party 112 is able to use the functionality described herein such that the virtual video of the remote party 112 depicts the remote party 112 not wearing an HMD.

The example in FIG. 1 is extended to the case where a hologram of the person, as if not wearing the HMD, is displayed at the remote party where the remote party is an HMD.

The technology used to compute images of the HMD wearer as if not wearing the HMD is used for a variety of different useful purposes including but not limited to: telepresence applications, video games, films, video conferencing. The images which are computed are used to generate expressive, realistic holograms of the person as if not wearing the HMD, to generate avatars in computer games or films and for video conferencing.

The technology described herein which enables images of the person 100 to be computed as if not wearing an HMD is extremely powerful since it is generalizable to different people without the need for significant bespoke training. The generalizability is achieved, at least in part, through use of a three-dimensional (3D) face model as described in more detail later in this document.

The HMD comprises at least one face facing capture device configured and positioned such that it is able to capture sensor data depicting a partial view of a face of the wearer. A non-exhaustive list of examples of types of face facing capture device is: colour video camera, infrared camera, time-of-flight depth camera, endoscopic camera, greyscale camera, fisheye camera. In the example of FIG. 1, at least one face facing capture device is positioned in a boom 104 extending from a body of the HMD such that in use, when the HMD is worn the boom extends generally over a temple of the wearer and towards a mouth of the wearer.

Figure 2:
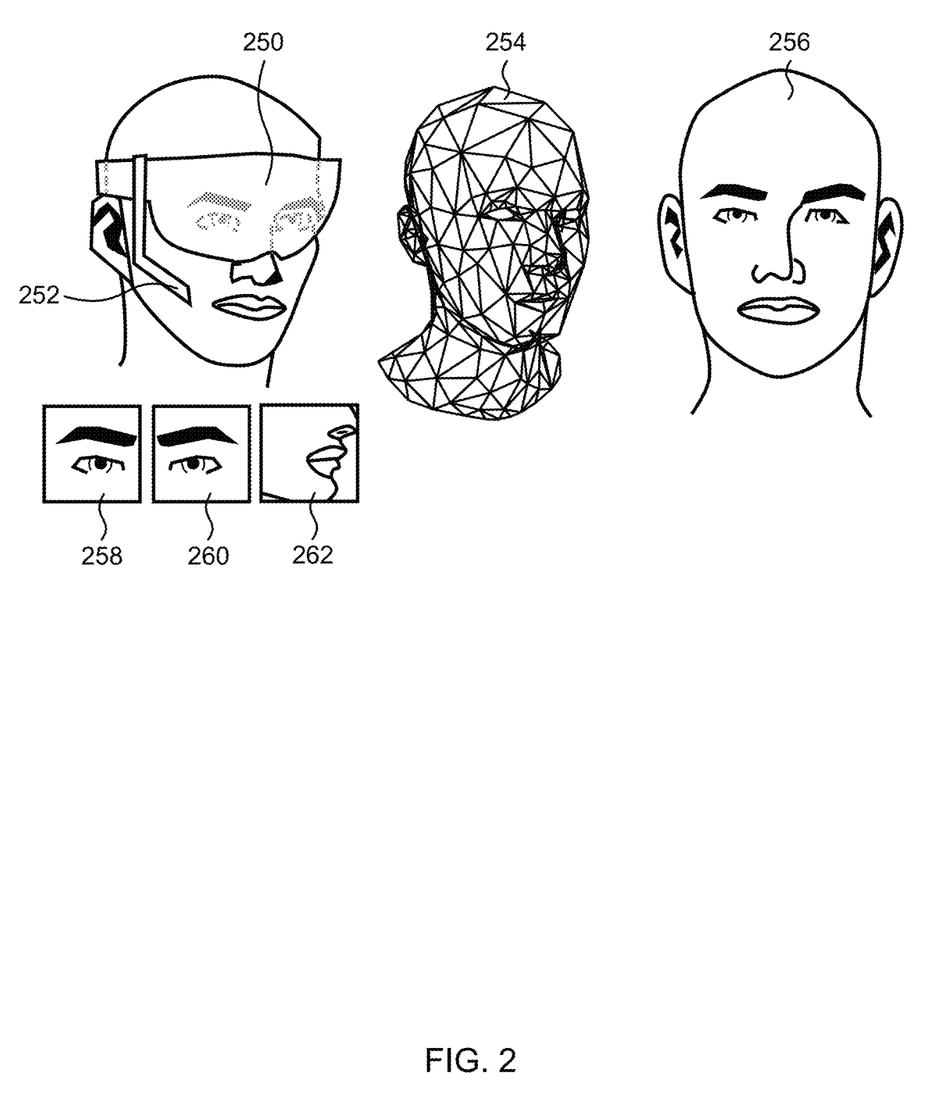
FIG. 2 is an example of images captured from face facing capture devices in an HMD.

In the example of FIG. 1 two additional face facing capture devices are present but not visible since these are obscured by the body of the HMD. The two additional face facing capture devices comprise a first eye facing capture device and a second eye facing capture device. The first and second eye facing capture devices (right eye facing capture device and left eye facing capture device) are infra-red capture devices which are already available in the HMD as part of an eye tracking apparatus of the HMD. The field of view of the first and second eye facing capture devices is arranged such that it includes an eye itself, part of a nose, as well as a cheek region around the eye. FIG. 2 includes a schematic example of images captured from the face facing capture devices of the HMD of FIG. 1. An image 258 captured by a left eye facing capture device, an image 260 captured by a right eye facing capture device, and an image 262 captured by the capture device in boom 104. The images 258, 260, 262 were captured within the same time interval. Note that each of the face facing capture devices has a partial view of the face and is unable to gain a complete view of the face.

It is not essential to use three face facing capture devices. Any arrangement using at least one face facing capture device is possible.

Other positions and arrangements of the face facing capture device are used in some cases. In an example, one or more endoscopic cameras are placed on the rim of the HMD.

Because the HMD itself obscures much of the face of the wearer it is not possible to gain a complete view of the face using a capture device outside the HMD such as on the wall near light switch 106. Because of the small amount of space between the HMD and the wearer's face it is not possible to observe the complete face of the wearer from a viewpoint within the HMD and so it is necessary to make predictions. The sources of observed data which are available to make the predictions from include the empirically observed sensor data from the face facing capture devices. However, these give only partial views of the face of the wearer. The term "partial view" means an image depicting some but not all of the wearer's face.

It is found that using three face facing capture devices with fields of view as in the examples of FIG. 1 and FIG. 2 gives particularly good results. It is thought this is because the eye and mouth regions are important for predicting expression of the wearer of the HMD.

In the example of FIG. 1 the HMD also has one or more capture devices positioned so as to capture images of the wearer's hands. The hand images are used to track pose of the wearer's hands and to drive a 3D model of the hands which is then used to render hand images for inclusion in the virtual web cam stream, avatar, hologram or other output.

FIG. 2 is a schematic diagram of a person wearing an HMD 250 which has a camera in a boom 252 extending from a temple of the HMD. The camera is positioned in the boom 252 so as to have a field of view that encompasses a mouth region of a wearer of the HMD. Image 262 shows an image captured by a camera in the boom 252. Two eye facing cameras within the HMD 250 capture images such as images 258 and 260 of FIG. 2.

FIG. 2 also shows a 3D model of a face 254 comprising a polygon mesh and described in more detail in this document. The technology of the present disclosure computes an image of the wearer of the HMD such as image 256 which depicts the wearer as if he or she is not wearing the HMD.

Figure 3:
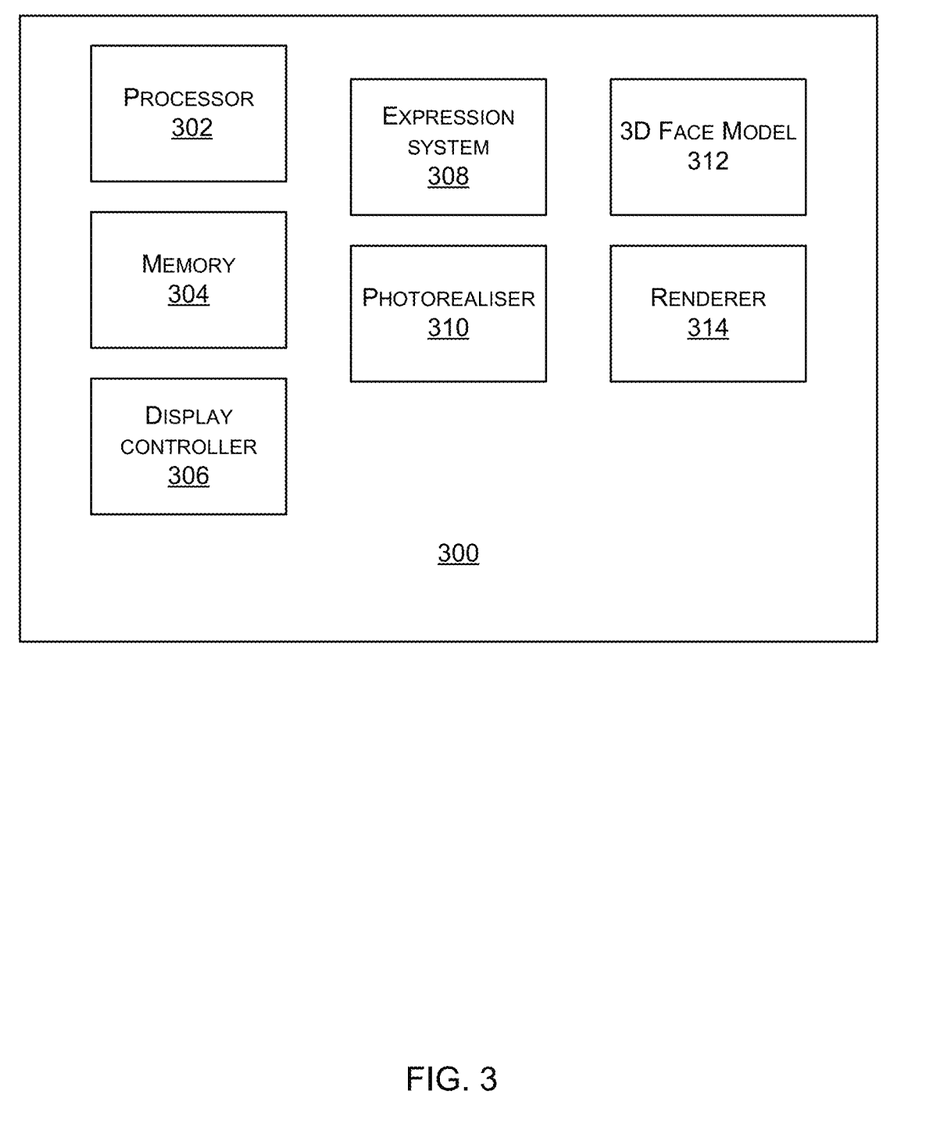
FIG. 3 is a schematic diagram of an apparatus for computing images of an HMD wearer's face.

FIG. 3 is a schematic diagram of an apparatus 300 for computing images of an HMD wearer's face. The apparatus of FIG. 3 is integral with an HMD in some cases. In other cases the apparatus is remote of the HMD such as in a companion computing device of the HMD or in a cloud service deployment. A companion computing device is a computing device which is physically proximate to the HMD and is in wired or wireless communication with the HMD. Examples of companion computing devices are smart phones, smart watches, laptop computers and others. A cloud service deployment is one or more web servers hosting functionality of the apparatus of FIG. 3 and which are accessible to the HMD. In some cases the functionality of the apparatus of FIG. 3 is shared between an HMD and any of a cloud service and a companion computing device.

The apparatus comprises at least one processor 302, a memory 304 and a display controller 306 which controls display of one or more virtual objects by the HMD. The apparatus comprises an expression system 308 which takes as input sensor data captured by the at least one face facing capture device, and computes as output values of expression parameters. The expression system comprises a machine learning model which has been trained to compute expression parameters from the input image. The photorealiser 310 is a machine learning model trained to map images rendered from a 3D face model to photorealistic images.

The apparatus comprises a 3D face model 312 having parameters, which are at least expression parameters, and which is described in more detail with reference to FIG. 5. In one embodiment the 3D face model 312 has identity, expression and pose parameters. The identity parameters specify which individual person an instantiation of the 3D face model represents. The expression parameters specify shape and appearance of the 3D face model due to facial expression which is not explained by pose. The pose parameters specify position and orientation of movable components of the 3D face model such as jaw bone, neck bones, eye balls, tongue. The values of the pose parameters are inferred using data from one or more capture devices such as cameras in the HMD. Eye pose and jaw pose are determined using outputs from eye and boom cameras in some cases. It is possible to use a 3D face model with only the expression parameters, such as where the pose and identity parameters are preconfigured or where it is not necessary to move the jaw and eyes. The apparatus also comprises a renderer 314 for rendering images from the 3D face model 312. The renderer is any apparatus for rendering an image from a 3D model such as a commercially available computer graphics renderer which uses ray tracing and information about a viewpoint of a virtual camera in order to render images. The viewpoint of the virtual camera is configured during manufacture or is set by an end user. The apparatus receives input from at least one face facing capture device of the HMD.

The expression system and 3D face model of the disclosure operate in an unconventional manner to achieve generation of images of wearers of an HMD as if the HID was absent, and in a way which is generalizable to different individual wearers.

The expression system and 3D face model improve the functioning of the underlying computing device by facilitating generation of images of many different individual wearers of an HID with the HID absent from the generated images.

Alternatively, or in addition, the functionality of FIG. 3 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 4:
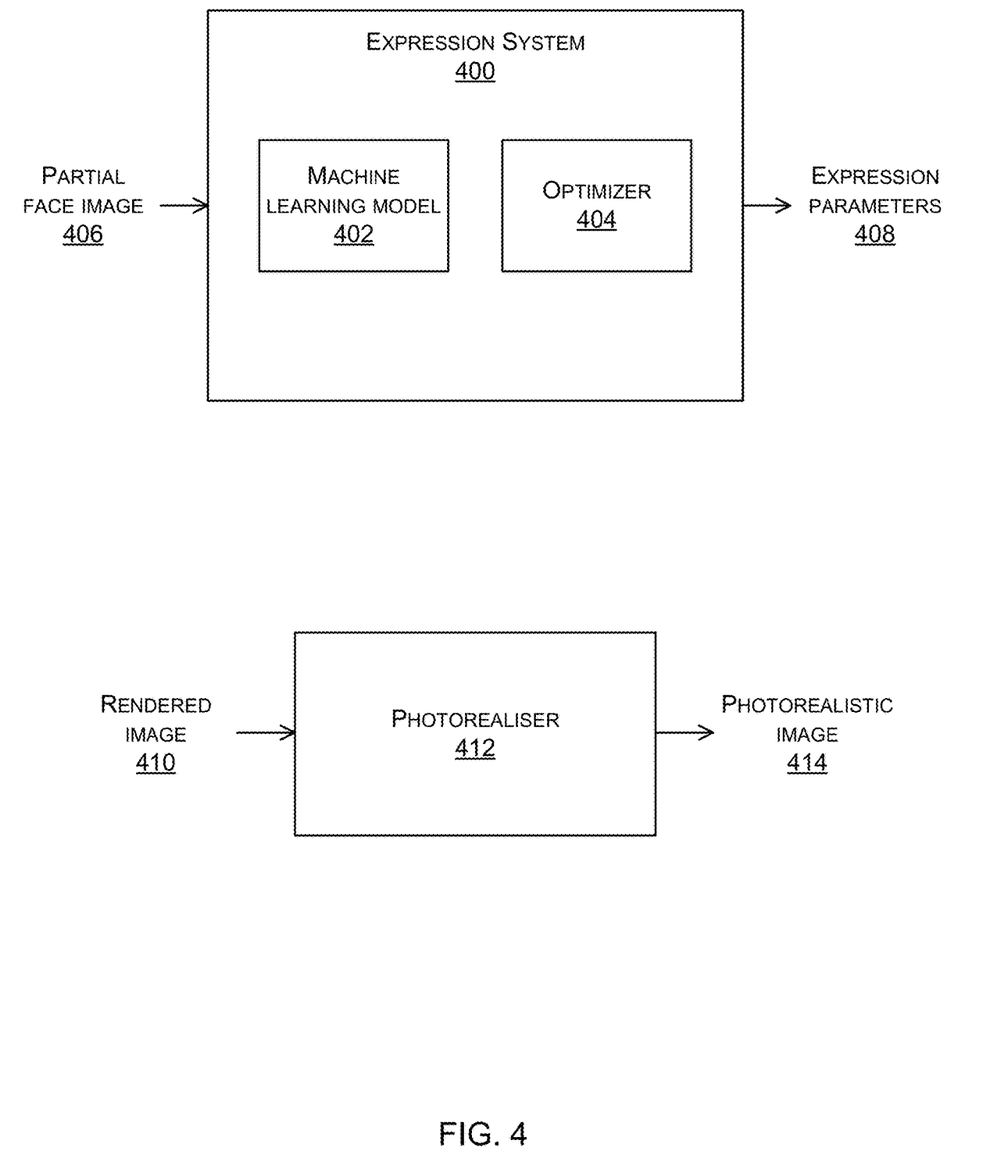
FIG. 4 is a schematic diagram of an expression system and a photorealiser.

More detail about the expression system and the photorealiser is now given with reference to FIG. 4. An expression system 400 such as that of FIG. 3 comprises a machine learning model 402 and an optimizer 404. The expression system receives as input one or more partial face images 406 captured, within a specified time interval of one another, by one or more face facing capture devices in an HMD worn by a person. Examples of partial face images are given in FIG. 2. The partial face images are input to a trained machine learning model 402. The trained machine learning model is a neural network, or any other suitable type of machine learning model such as a random decision forest, support vector machine or other machine learning model. The machine learning model predicts positions of a plurality of specified landmarks on the face of the wearer of the HMD. The positions of the specified landmarks are input to an optimizer which computes an optimization to obtain values of expression parameters 408 of a 3D model of a face. The landmarks are first defined using barycentric coordinates over the parametrized head mesh. During synthetic training, the landmarks are projected accurately from the 3D model to camera space for use as ground-truth training data. At runtime, a deep neural network (DNN) so trained extracts 2D landmarks corresponding to those seen in training. It then projects (using the same barycentric coordinates) from the posed mesh into camera space and, for each landmark, tries to minimize a distance penalty (e.g. Euclidean norm) in the 2D position.

Note that it is not essential to use a landmark based approach. In some example a deep neural network is trained to directly predict expression parameter values from the HMD inputs without the use of landmarks.

In an example the machine learning model 402 of the expression system 400 has been trained using synthetic images depicting partial views of a face of an HMD wearer, the synthetic images associated with known expression parameters.

The synthetic images are generated by rendering from a 3D model of a head and face, where the head is wearing an HMD and using virtual camera view points corresponding to view points of one or more face facing capture devices in the HMD. Values of expression parameters of the 3D model are set before generating one or more synthetic images. A wide variety of different values of expression parameters are used in order to generate a wide variety of training data.

In an example, the synthetic images are generated by sampling from a parametric face model, applying expression to the sampled parametric face model, adding a virtual HMD and virtual illumination, rendering from the viewpoint of one or more face facing capture devices in the virtual HMD.

In an example, the parametric face model is a composite model formed from a plurality of individual models. The individual models comprise one or more of: a geometry model, a texture model, a hair model an eye colour model.

The geometry model, is based on linear identity and expression basis with linear blend-skinning for controlling eye, jaw and head motion. To sample from the geometry model a Gaussian Mixture Model is used that produces an identity coefficient that represents a novel face identity.

The texture model is comprised of albedo and displacement textures. The albedo texture represents the skin color while the displacement represents wrinkling and pore level displacement. An exemplar-based approach is used to sample from registered and manually cleaned albedo and displacement maps.

The hair model is comprised of curves defining individual hair strands for head, eyebrow, and beard hair. An exemplar-based approach is used to sample from possible constructed hairstyles.

The eye colour model is an exemplar-based eye colour sampler.

Each of the above individual models is sampled individually and independently to arrive at a complete face identity that is renderable.

In order to select values of the expression parameters of the 3D face model, an expression model is used and values are sampled from the expression model. In a non-limiting example, the expression model is a linear basis-based expression model with more than 50 bases and with around ten pose coefficients. The coefficients are sampled from an expression library. The library is constructed by fitting the parametric 3D face model to annotated 2D facial landmarks in images and using soft constraints from manual annotations.

Once the face is setup an HMD computer automated design (CAD) model is placed on the synthetic head in an occlusion-aware way. The placement is based on a manual placement on a mean head shape, which is adjusted if the device intersects with the head.

Where the HMD illuminates the face using infrared light emitting diodes (LEDs), the infrared LEDs are modelled in the synthetic pipeline as spot lights, with the LED pattern being sequenced per frame.

To model illumination and background objects of a mouth facing camera high dynamic range imagery (HDRI) is used as illumination and background of the scene. Sample a different HDRI from a library for each scene, and optionally rotate the HDRI every n frames to simulate head rotation and background motion. To model face facing capture devices use focal length, depth of field and resolution to match the properties of real face facing capture devices on the HMD.

The machine learning model 402 of the expression system is trained using supervised training with a loss function which is a measure of difference between the predicted expression parameter values and the known expression parameter values of the training example. In an example, the machine learning model is a convolutional neural network and is trained using backpropagation.

In examples where the expression system is integral with the HMD the machine learning model 402 is designed to operate on a resource constrained device and comprises depthwise separable convolutional building blocks.

In various examples the expression system neural network is designed in such that it is possible to be trained in a general way from a large, diverse population of users and then adapted to an individual with minimal data. In order to achieve this "meta-learning" is exploited. One example of a type of meta-learning which is used in some examples is: A neural network (NN), A, is first trained on a large corpus of data. Then a second NN, B, is trained to take some auxiliary input (e.g. a photo of a person) and alter the weights and/or activations of the original NN, A, such that it will perform better on instances that are unseen during training and/or outside of the original dataset distribution. At runtime, NN B is first provided with the auxiliary input and alters NN A so that it performs more accurately on the subject.

A photorealiser 412 is a machine learning model which maps rendered images 410 to photorealistic images 414. Using a photorealiser enables the uncanny valley phenomenon to be alleviated. The uncanny valley phenomenon occurs when feelings of unease and revulsion in observers presented with a close-to-realistic rendered video of a talking head are provoked. The rendered images are rendered from a 3D face model once values of expression parameters of the 3D face model have been specified. The machine learning model of the photorealiser 412 is a deep neural network or any other suitable type of machine learning model such as a random decision forest or support vector machine.

The machine learning model of the photorealiser is trained with pairs of data, each pair comprising a photograph captured from a camera in a camera rig and depicting a frontal view of a real person with an expression, and an image rendered from a 3D face model when configured with values of parameters corresponding to the expression. A camera rig is an apparatus where one or more cameras are mounted on supports in a stable manner such that camera position does not significantly drift during capture. The 3D camera positions themselves are determined as part of a calibration process. The camera rig is calibrated such that there is pixel to pixel correspondence between the photograph and the rendered image. The machine learning model is trained using supervised training. The t raining data pairs are obtained for a variety of different camera view points in the camera rig and, for each view point, a wide variety of different expressions of the person.

In an example, the machine learning model if the photorealiser is a generative adversarial network, such as a conditional adversarial network which learns a mapping from the rendered image domain to the photorealistic output domain and also learns a loss function to train the mapping. Using a generative adversarial network is found to give high quality performance of the photorealiser.

In some embodiments, the apparatus is to be used for an individual where no training data about the individual was used to train the photorealiser. In this case it is possible to further improve performance of the photorealiser by fine-tuning it with 2D views of a particular individual not wearing the HMD. The fine-tuning process involves training a photorealiser from a large corpus of data as mentioned above, i.e. (camera_pose, 3D model, 2D image of human not wearing an HMD). A finetuning (or metalearning) neural network is trained. The finetuning neural network is then used to adapt the weights of the photorealiser from a reference photograph of a new, unseen user.

The original photorealiser may perform well for some subjects without alteration, but others not. The finetuning network (with some kind of input, e.g. a reference photograph) modifies the original network to improve overall quality for all users, even those who are outside of the original data distribution. Note that it is not essential to use fine tuning.

In the examples described herein the 3D face model comprises a template face as well as a 3D topology. The 3D topology comprises a polygon mesh and a UV map. A UV map is a mapping from vertices of the polygon mesh to texture. By making the 3D face model modular where the template face and the 3D topology are separate modules. The modular construction facilitates replacement of modules when needed for different application domains. However, it is not essential to use a modular 3D face model.

Figure 5:
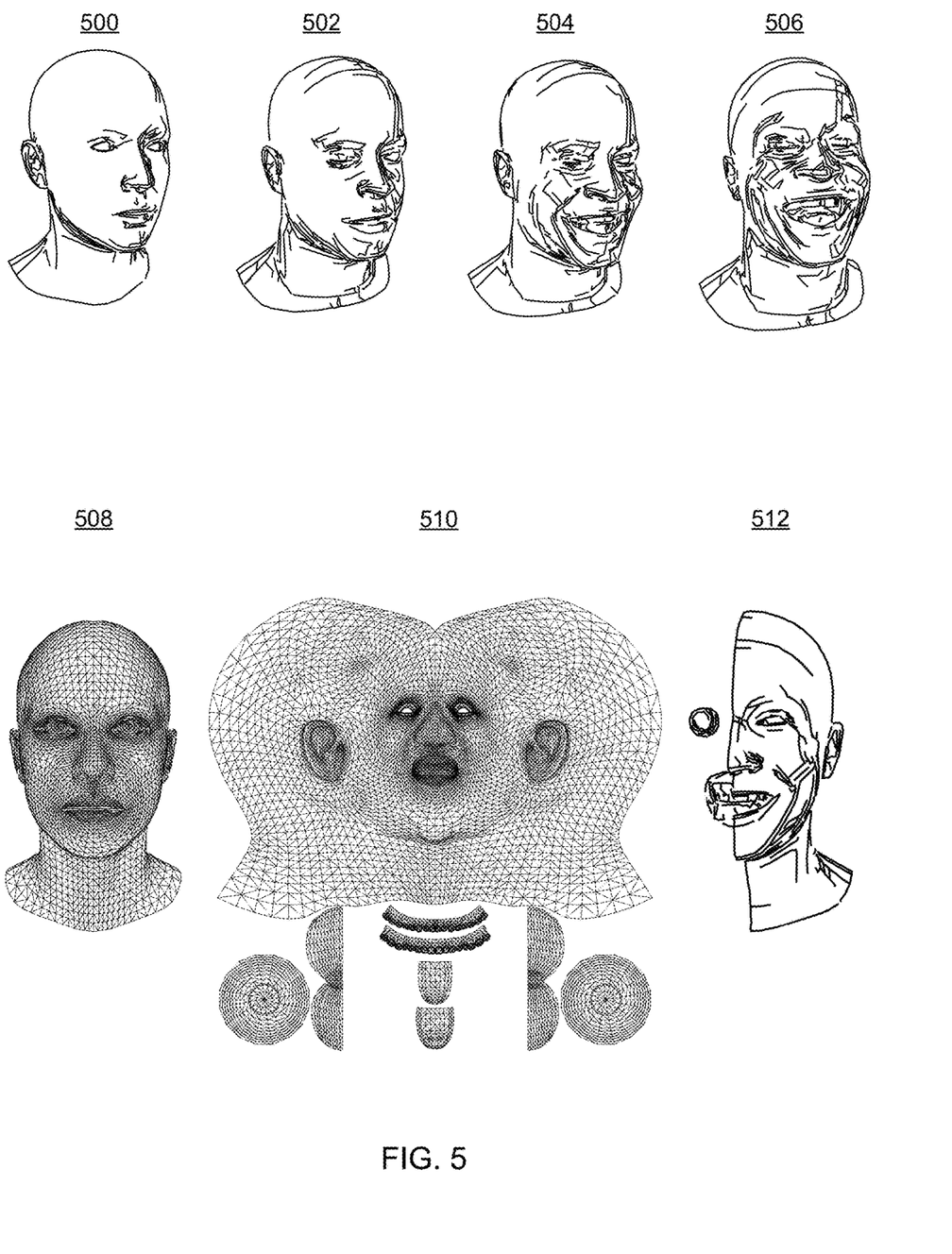
FIG. 5 is a schematic diagram of a three-dimensional (3D) model of a face.

FIG. 5 is a schematic diagram of a template mesh 500 of a generic person with a neutral pose and neutral expression and where the template mesh is shown covered with a smooth surface. The term "generic" is used to refer to the fact that the template mesh is an average of a huge number of different human faces. The template mesh 500 is first deformed based on identity of an individual to create the result shown in 502 of FIG. 5 which is a 3D model of a face of a particular individual with a neutral expression. The result in 502 of FIG. 5 is deformed using a second deformation based on values of expression parameters to give the result shown in 504 of FIG. 5 which represents the same individual as in 502 but with a smiling and eyes closed expression. When values of pose parameters are added the result is show in 506 of FIG. 5 where the head is tilted back, the head is turned to the right and the jaw is opened. The pose parameters pose the eyes as well as the bones of the neck and jaw.

The template mesh 500 of a generic person is intended as an average of all human faces and facilitates generalizability of the technology described herein to different individuals. In contrast, alternative technologies work well for specified individuals and are difficult to operate well for other individuals without significant re-training.

The template mesh of 500 is shown in a frontal view with the polygons visible at 508 of FIG. 5 and the UV map is shown at 510 of FIG. 5. It is seen from the UV map that the polygon mesh density increases in density and thus detail near the eyes and mouth. Thus the polygon mesh has a higher density of vertices in some regions than in other regions. At 512 is shown a cutaway of the template mesh 500, 508 showing the eyeballs and the mouth interior. By increasing the mesh density near the eyes and mouth efficiency is gained since it is possible to model expression accurately by having more mesh vertices near the eyes and mouth whilst at the same time limiting the number of vertices of the mesh. The more vertices in the mesh the more computational and memory resources are needed to manipulate and store the mesh. By including 3D representation of internal structure of the head such as eyeballs, mouth interior, teeth, tongue, improved quality of performance is obtained.

Figure 6:
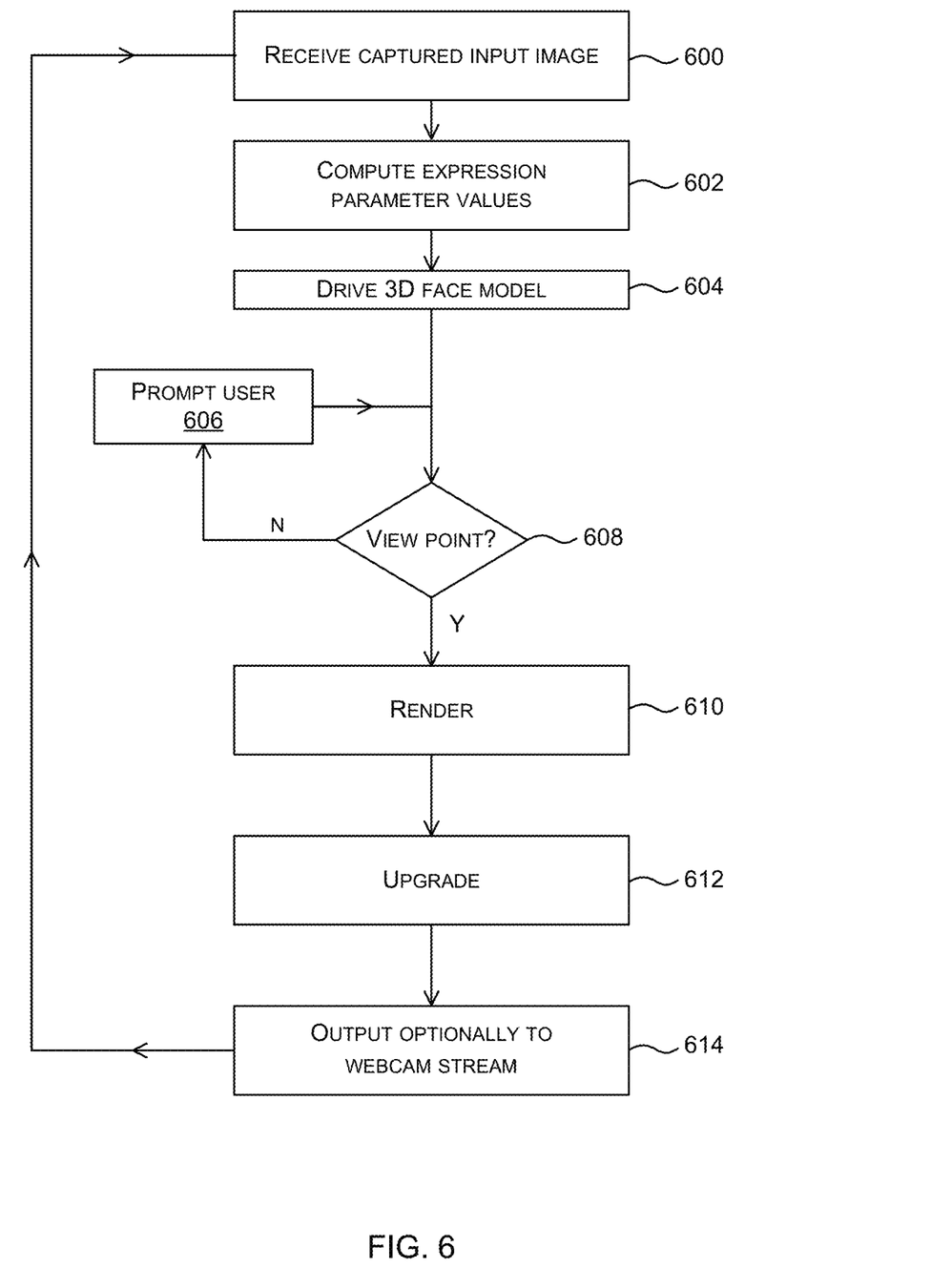
FIG. 6 is a flow diagram of a method of operation at an apparatus for computing images of an HMD wearer's face.

FIG. 6 is a flow diagram of a method of operation at an apparatus for computing images of an HMD wearer's face. A captured input image is received 600 from at least one face facing capture device. The captured input image depicts a partial view of the wearer of the HMD.

The captured input image is input to an expressions system which computes 602 expression parameter values of a 3D face model such as that described with reference to FIG. 5. The expression parameter values are used to drive 604 the 3D face model. The term "driving" the 3D face model means that the expression parameter values are inserted into the 3D face model and used to configure the shape and pose of the 3D face model so it more closely represents a face depicted in the captured input image. In some examples, values of identity parameters of the 3D face model are determined in advance via an offline process and are also used to drive the 3D face model. In other examples, the values of the identity parameters are derived from the observed data, i.e., the input images.

In a first example the offline process to determine the values of identity parameters comprises a new user entering a 3D capture rig and capturing the 3D geometry of their head using the 3D capture rig. Then, via a process called "retopologisation", values of parameters are found for the 3D model which minimize the differences between the 3D model and the observed 3D geometry. Tools for performing mesh retopologisation are commercially available.

In a second example the identity parameters of the model are determined from one or more photographs from uncalibrated cameras. A NN is then used which predicts identity parameters from the photographs. Alternatively an optimization process is used which finds the identity parameters which minimize face recognition and/or perceptual energies (i.e. find the identity parameters which make the 3D model look as much as possible like the photographs). Hybrids of the NN and optimization process are possible.

A check is made at check 608 whether a viewpoint has been selected. The viewpoint is a viewpoint of a virtual camera virtually viewing the HMD wearer. If no viewpoint has been selected the process prompts a user 606 to select a viewpoint or uses a default view point. Once the viewpoint of the virtual camera is specified and input to a renderer, an image is rendered 610 from the 3D face model with the instantiated parameter values. Any commercially available renderer is used and the term "rendering" is a term of art in the field of computer graphics which is well understood. The rendered image is stored in memory and is not necessarily displayed.

In order to bridge the uncanny valley the rendered image is upgraded 612 using a photorealiser as described above. The upgraded image is output to a virtual webcam stream 614 or a display. The process returns to operation 600 for the next captured input image so that the method of FIG. 6 repeats iteratively.

The method of FIG. 6 operates in real time or near real time.

Figure 7:
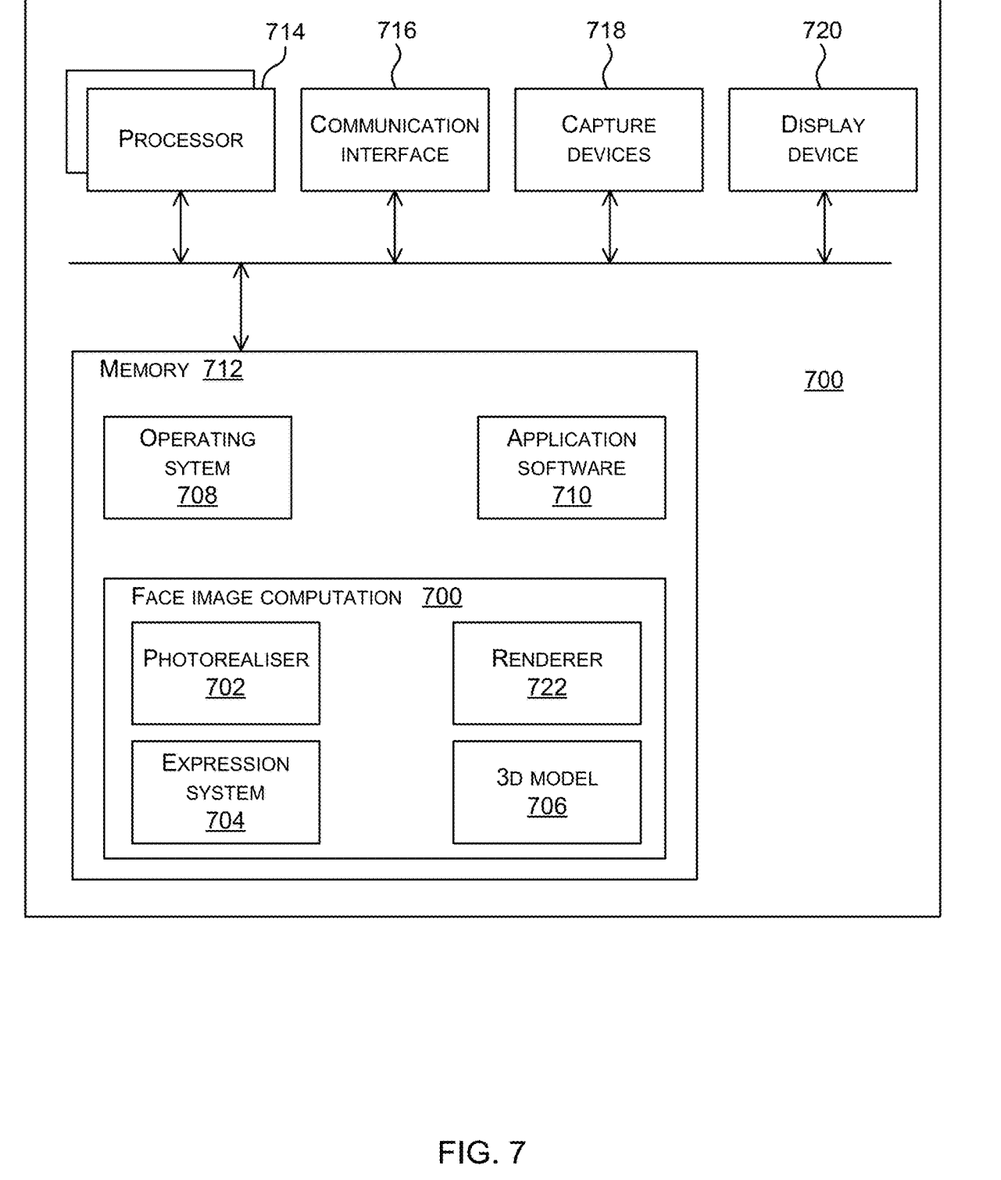
FIG. 7 illustrates an exemplary computing-based device in which embodiments of an HMD are implemented.

FIG. 7 illustrates various components of an exemplary HMD computing-based device 700 which has functionality to compute images of a wearer of the HMD as if the HMD were absent.

Computing-based device 700 comprises one or more processors 714 which are microprocessors, controllers or any other suitable type of processors for processing computer executable instructions to control the operation of the HMD in order to compute images of the wearer of the HMD as if the HMD were absent. In some examples, for example where a system on a chip architecture is used, the processors 714 include one or more fixed function blocks (also referred to as accelerators) which implement a part of the method of FIG. 6 in hardware (rather than software or firmware). Platform software comprising an operating system 708 or any other suitable platform software is provided at the HMD computing-based device to enable application software 710 to be executed on the device such as a video conferencing application, telepresence application, computer game or other application. The HMD has a face image computation 700 functionality which computes images of the HMD wearer as if the HMD were absent. The face image computation 700 functionality comprises a photorealiser 702, an expression system 704, a renderer 722 and a 3D model 706 as described earlier in this document.

The computer executable instructions are provided using any computer-readable media that is accessible by HMD computing based device 700. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 712) is shown within the HMD computing-based device 700 it will be appreciated that the storage is, in some examples, distributed or located remotely and accessed via a network or other communication link (e.g. using communication interface 716 such as a wireless network communications interface).

The computing-based device 700 also comprises a display device 720 to display virtual objects to the wearer of the HMD such as a display which projects light directly into the eyes of the wearer. The HMD comprises one or more capture devices 718 as known in the art and including at least one face facing capture device.

Alternatively or in addition to the other examples described herein, examples include any combination of the following:

Clause A An apparatus comprising:
at least one processor;
a memory storing instructions that, when executed by the at least one processor, perform a method for computing an image depicting a face of a wearer of a head mounted display (HMD), as if the wearer was not wearing the HMD, comprising: accessing an input image depicting a partial view of the wearer's face captured from at least one face facing capture device in the HMD;

accessing an expression system comprising a machine learning model which has been trained to compute expression parameters from the input image, accessing a 3D face model that has expressions parameters;

accessing a photorealiser being a machine learning model trained to map images rendered from the 3D face model to photorealistic images;

computing expression parameter values from the image using the expression system;

driving the 3D face model with the expression parameter values to produce a 3D model of the face of the wearer;

rendering the 3D face model from a specified viewpoint to compute a rendered image; upgrading the rendered image to a photorealistic image using the photorealiser. By using a 3D face model it is possible to achieve good generalization ability such that the apparatus is useable by different individuals without the need for bespoke training. The parameterization of the 3D face model and the process of driving the 3D face model with the expression parameter values computed from the observed data facilitates the generalization ability.

Clause B The apparatus of clause A wherein the method further comprises inserting the photorealistic image into a virtual web cam stream. Inserting the photorealistic images into a virtual web cam stream gives a good way of bridging the uncanny valley (due to the photorealiser) and also provides a virtual web cam stream that is workable with existing applications and apparatus for processing web cam streams.

Clause C The apparatus of any preceding clause wherein the method further comprises one or more of: using the photorealistic image in a video conferencing application, using the photorealistic image to animate an avatar in a telepresence application. These are all useful, practical tasks for which the apparatus is deployed.

Clause D The apparatus of any preceding clause wherein the method comprises accessing a plurality of input images depicting different partial views of the wearer's face and using the plurality of input images to compute the values of the expression parameters. By using two or more input images depicting different partial views the performance of the apparatus improves since the amount of observed data is increased and expression of the wearer is predicted more accurately.

Clause E The apparatus of clause D wherein the plurality of input images comprise a first image depicting a first eye, a second image depicting a second eye, and a third image depicting a mouth. It is found in practice that using three input images in this way gives particularly accurate predictions of the wearer's face since the eye and mouth regions are found to be particularly important regarding facial expression.

Clause F The apparatus of any preceding clause wherein the expression system comprises a neural network and an optimizer. Using both a neural network and an optimizer gives an efficient result with high quality performance.

Clause G The apparatus of clause F wherein the neural network has been trained using synthetic images depicting partial views of a face of an HMD wearer, the synthetic images associated with known expression parameters. By using synthetic images it is possible to obtain a wide range of training data and to train the neural network extremely well so as to enable high performance.

Clause H The apparatus of any preceding clause wherein the 3D model has been trained using images of diverse people moving and talking. By training the 3D face model in this way it is generalizable to many different individuals without the need for bespoke training of the apparatus before operating for a particular individual wearer.

Clause I The apparatus of any preceding clause wherein the 3D model has a generic identity and generic texture. Using a generic identity and generic texture facilitates generalization to different individuals.

Clause J The apparatus of any preceding clause wherein the photorealiser comprises a neural network having been trained with pairs of 3d scans and frontal views of faces. In this way high quality photorealisation is achieved.

Clause K The apparatus of clause J wherein the photorealiser has been fine-tuned with 2D views of a particular individual not wearing the HMD.

Clause L The apparatus of any preceding clause wherein the viewpoint is selected according to user input. Enabling the user to select the viewpoint is extremely useful as it gives the user control over how he or she will be viewed by a remote party to a video call or other viewer.

Clause M The apparatus of any preceding clause eye and mouth regions of the polygon mesh than in other regions of the polygon mesh. Varying the density of vertices in this way gives efficiency in terms of memory and processing resources whilst still enabling high performance.

Clause N The apparatus of any preceding clause wherein the 3D model comprises a representation of eye balls, teeth and tongue. By including a representation of eye balls, teeth and tongue accuracy is increased.

Clause O The apparatus of any preceding clause integral with an HMD.

Clause P A computer-implemented method for computing an image depicting a face of a wearer of a head mounted display (HMD), as if the wearer was not wearing the HMD comprising:

accessing an input image depicting a partial view of the wearer's face captured from at least one face facing capture device in the HMD;

accessing an expression system comprising a machine learning apparatus which has been trained to compute expression parameters from the input image, accessing a 3D face model that has expressions parameters;

accessing a photorealiser being a machine learning model trained to map images rendered from the 3D face model to photorealistic images computing expression parameter values from the image using the expression system;

driving the 3D face model with the expression parameter values to produce a 3D model of the face of the wearer;

rendering the 3D model from a specified viewpoint to compute a rendered image; upgrading the rendered image to a photorealistic image using the photorealiser.

Clause Q The method of clause P further comprising one or more of: inserting the photrealistic image to a virtual webcam stream, sending the photorealistic image to a video conferencing application, sending the photrealistic image to a telepresence application.

Clause R The method of clause P further comprising accessing a plurality of input images depicting different partial views of the wearer's face and using the plurality of input images to compute the values of the expression parameters.

Clause S The method of clause R further comprising wherein the plurality of input images comprise a first image depicting a first eye, a second image depicting a second eye, and a third image depicting a mouth.

Clause T One or more device-readable media with device-executable instructions that, when executed by a computing system, direct the computing system to perform operations comprising:
    accessing an input image depicting a partial view of the wearer's face captured from at least one face facing capture device in the HMD;
    accessing an expression system comprising a machine learning apparatus which has been trained to compute expression parameters from the input image, accessing a generic 3D face model that has expressions parameters;
    accessing a photorealiser being a machine learning model trained to map images rendered from the 3D face model to photorealistic images computing expression parameter values from the image using the expression system;
    driving the 3D face model with the expression parameter values to produce a 3D model of the face of the wearer;
    rendering the 3D model from a specified viewpoint to compute a rendered image;
    upgrading the rendered image to a photorealistic image using the photorealiser.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An apparatus comprising:
    a processor;
    a memory storing instructions that, when executed by the processor, perform a method for computing an image depicting a face of a wearer of a head mounted display (HMD), as if the wearer was not wearing the HMD, comprising:
    accessing an input image depicting a partial view of the wearer's face captured from a face facing capture device in the HMD;
    accessing an expression system comprising a machine learning model trained to compute expression parameters from the input image;
    accessing a three-dimensional (3D) face model;
    accessing a photorealiser being a machine learning model trained to map an image rendered from the 3D face model to a photorealistic image;
    adapting a weight of the photorealiser from a reference photograph of the wearer, wherein the wearer is an unseen user to the photorealiser;
    computing expression parameter values from the image using the expression system;
    driving the 3D face model with the expression parameter values to produce a 3D model of the face of the wearer;
    rendering the 3D model from a specified viewpoint to compute a rendered image; and upgrading the rendered image to a photorealistic image using the photorealiser.

2. The apparatus of claim 1 wherein the method further comprises inserting the photorealistic image into a virtual web cam stream.

3. The apparatus of claim 1 wherein the method further comprises one or more of: using the photorealistic image in a video conferencing application, using the photorealistic image to animate an avatar in a telepresence application.

4. The apparatus of claim 1 wherein the method comprises accessing a plurality of input images depicting different partial views of the wearer's face and using the plurality of input images to compute the expression parameter values.

5. The apparatus of claim 4 wherein the plurality of input images comprise a first image depicting a first eye, a second image depicting a second eye, and a third image depicting a mouth.

6. The apparatus of claim 1 wherein the expression system comprises a neural network that has been trained using synthetic images depicting partial views of a face of an HMD wearer, the synthetic images associated with known expression parameters.

7. The apparatus of claim 1 wherein the 3D face model has a generic identity and generic texture.

8. The apparatus of claim 1 wherein the photorealiser comprises a neural network having been trained with pairs of 3D scans and frontal views of faces.

9. The apparatus of claim 8 wherein adapting the weight of the photorealiser from a reference photograph of the wearer comprises fine-tuning the photorealiser with 2D views of a particular individual not wearing the HMD.

10. The apparatus of claim 1 wherein the viewpoint is selected according to user input.

11. The apparatus of claim 1 wherein the 3D model comprises a polygon mesh with higher density of vertices in eye and mouth regions of the polygon mesh than in other regions of the polygon mesh.

12. The apparatus of claim 1 wherein the 3D model comprises a representation of eye balls, teeth and tongue.

13. The apparatus of claim 1 integral with an HMD.

14. The apparatus of claim 1, wherein no training data about the wearer was used to train the photorealiser.

15. A computer-implemented method for computing an image depicting a face of a wearer of a head mounted display (HMD), as if the wearer was not wearing the HMD comprising:
accessing an input image depicting a partial view of the wearer's face captured from a face facing capture device in the HMD;
accessing a hand image of a hand of the wearer;
computing expression parameter values from the input image using an expression system;
driving a 3D face model with the expression parameter values to produce a 3D face model of the face of the wearer;
rendering the 3D face model from a specified viewpoint to compute a rendered face image;
upgrading the rendered face image to a photorealistic image using a photorealiser;
driving a 3D hand model of the hand of the wearer using the hand image; and
rendering the 3D hand model to compute a rendered hand image.

16. The method of claim 15 further comprising one or more of: inserting the rendered hand image to a virtual webcam stream, sending the rendered hand image to a video conferencing application, sending the rendered hand image to a telepresence application.

17. The method of claim 15 further comprising accessing a plurality of input images depicting different partial views of the wearer's face and using the plurality of input images to compute the expression parameter values, wherein the plurality of input images comprise a first image depicting a first eye, a second image depicting a second eye, and a third image depicting a mouth.

18. The method of claim 17 further comprising tracking a pose of the wearer's hand using the hand image, wherein driving the 3D hand model comprises driving the 3D hand model using the tracked pose of the wearer's hand.

19. A device-readable medium with device-executable instructions that, when executed by a computing system, direct the computing system to perform operations comprising:
accessing an input image depicting a partial view of a wearer's face captured from a face facing capture device in a head mounted display (HMD);
accessing an expression system comprising a machine learning apparatus trained to compute expression parameters from the input image;
accessing a generic three-dimensional (3D) face model that has an expression parameter and an identity parameter;
accessing a photorealiser being a machine learning model trained to map an image rendered from the 3D face model to a photorealistic image;
computing an expression parameter value from the input image using the expression system;
determining an identity parameter value, wherein determining comprises one or more of:
deriving the identity parameter value from the input image,
using a neural network to predict the identity parameter value from a photograph from an uncalibrated camera,
using an optimization process to find the identity parameter value which makes the 3D face model look as much as possible like the photograph,
using a retopologisation process;
driving the 3D face model with the identity parameter value and the expression parameter value to produce a 3D model of the face of the wearer;
rendering the 3D model from a specified viewpoint to compute a rendered image; and
upgrading the rendered image to a photorealistic image using the photorealiser.

20. The device-readable medium of claim 19, wherein determining the identity parameter value comprises determining an identity parameter value in advance via an offline process.

* * * * *